UNITED STATES PATENT OFFICE.

LOTHAR E. WEBER, OF BRIGHTON, MASSACHUSETTS.

PLASTIC MATERIAL.

1,302,740.    Specification of Letters Patent.    Patented May 6, 1919.

No Drawing.    Application filed October 1, 1917. Serial No. 194,244.

*To all whom it may concern:*

Be it known that I, LOTHAR E. WEBER, a subject of Great Britain, residing at Brighton, in the county of Suffolk and State of Massachusetts, have invented an Improved Plastic Material, of which the following is a specification.

This invention has reference to an improved plastic material or substance adapted to resist wear and adapted to be readily molded in thick or thin sheets or other articles.

One object of the invention is to provide plastic material of a water resisting nature and containing fibers or other wear resisting elements, said material being so constituted that although hard and tough at the completion of its manufacture, it may become sufficiently plastic to be molded or shaped by immersing the same in warm water.

Another object of the invention is to provide a novel substitute for leather or similar more or less flexible material.

Other objects of the invention will appear from the following description.

The invention consists in a plastic material having embedded therein a quantity of fibers or other elements adapted to increase the strength of said plastic matter.

The invention also consists in the plastic composition comprising the novel combination of constituents hereinafter described and pointed out in the claims.

Plastic material is not usually of a nature to be used as a substitute for flexible material subjected to wear and has comparatively little tensile strength; such material has heretofore been of such a nature as to become hard and brittle after a comparatively short time. In order partially to overcome this last objection, glycerin has been added to such plastic material, but has been found to be expensive and not wholly satisfactory.

In carrying my invention into practice I take equal parts of any well known glue, water and emulsifiable or sulfonated oil, preferably sulfonated fish oil. As an illustration of the process of manufacture I take ten parts of glue and dissolve the same in ten parts of water and to this solution I add ten parts of sulfonated fish oil, as a softening or tempering agent, and mix the whole, thus forming a fluid adhesive mass. This mass is then brought to any desired suitable temperature and to such mass is supplied a suitable quantity of cotton, woolen or other fibers or elements having a degree of tensile strength to increase the wearing qualities of the plastic material. I find that one part of said fibers or elements is sufficient in some cases but in other cases the amount of fibers or elements may be considerably increased. Where the new material is to be used for soles of shoes the proportion of said fibers or elements may be such that the plastic material acts mainly as a binder to bind together the mass of fibers or elements. Preferably after the addition of the fibers or elements to the plastic mass I add thereto approximately fifty parts of a hardening or curing agent of any known kind and for this purpose I prefer to add a $2\frac{1}{2}\%$ solution of formaldehyde, but the strength of this solution may be greater or less than that named.

The product of such process is a mass of material adapted to be spread in sheet form of any desired thickness and I now proceed to spread said mass in such sheet form and subject the same to a temperature of approximately 65° C. for a period of one hour, more or less, whereby the tendency of said temperature is to drive the moisture from said mass thereby producing a hard and tough but workable material from which practically all of the moisture has been eliminated. By immersing the material in warm water for a short period of time the material becomes so plastic that it can easily be molded.

As a supplemental step in the process of manufacture I take the plastic material either in a mass or in sheet form and subject the same to a considerable pressure whereby, after the drying process, the material becomes comparatively hard and springy but is adapted to be softened by treatment with warm water.

Having thus described my invention I claim as new and desire to secure by Letters Patent:

1. Plastic material composed of glue, sulfonated oil, fibers and formaldehyde, in the proportions approximately as named.

2. That process of making plastic material which consists in providing a solution of glue and water, adding thereto sulfonated fish oil, adding and mixing therein a quantity of fibers, and supplying to the product a hardening agent.

3. The process of making plastic material which consists in providing a solution of glue and water, adding thereto sulfonated fish oil, adding and mixing therein a quantity of fibers, supplying to the product a comparatively weak solution of formaldehyde, and subjecting the product to pressure and heat.

LOTHAR E. WEBER.